US007991556B2

(12) United States Patent
Goswami et al.

(10) Patent No.: US 7,991,556 B2
(45) Date of Patent: Aug. 2, 2011

(54) METHODOLOGY AND APPLICATION OF MULTIMODAL DECOMPOSITION OF A COMPOSITE DISTRIBUTION

(75) Inventors: Jaideva C. Goswami, Sugar Land, TX (US); Denis Heliot, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 137 days.

(21) Appl. No.: 11/955,489

(22) Filed: Dec. 13, 2007

(65) Prior Publication Data
US 2009/0105956 A1    Apr. 23, 2009

Related U.S. Application Data

(60) Provisional application No. 60/981,690, filed on Oct. 22, 2007.

(51) Int. Cl.
*G01V 1/40* (2006.01)

(52) U.S. Cl. ........... 702/11; 702/1; 702/2; 702/6; 702/7; 702/8; 702/14; 702/127; 702/189; 709/230; 709/231; 709/246; 709/247; 340/500; 340/853.1; 340/870.01; 340/870.07; 340/870.16

(58) Field of Classification Search ............... 702/1, 2, 702/6, 7, 8, 11, 14, 127, 189; 709/230, 231, 709/246, 247; 340/500, 825, 853.1, 870.01, 340/870.07, 870.16
See application file for complete search history.

(56) References Cited

U.S. PATENT DOCUMENTS

| | | | |
|---|---|---|---|
| 6,512,371 B2* | 1/2003 | Prammer | 324/303 |
| 7,133,777 B2 | 11/2006 | Goswami et al. | |
| 2003/0016012 A1* | 1/2003 | Coates et al. | 324/303 |
| 2005/0240349 A1* | 10/2005 | Goswami et al. | 702/6 |

OTHER PUBLICATIONS

Ngatchou et al., "Pareto multi Objective Optimization," Intelligent systems applications to power Systems, 2005. Proceedings of the 13th International Conference, Nov. 6-10, 2005 pp. 84-91.*
Overlap integral expression, IUPAC Compendium of chemical terminology, 2nd Ed. 1997.*
Zitzler, "A tutorial on Evolutionary Multiobjective Optimization" (2003).*

* cited by examiner

*Primary Examiner* — Jonathan C Teixeira Moffat
*Assistant Examiner* — Hyun Park
(74) *Attorney, Agent, or Firm* — Shaun Sethna; Kevin McEnaney; Darla Fonseca

(57) ABSTRACT

A method for analyzing formation data includes decomposing the formation data into simple components that can be used to reconstruct the formation data, wherein the decomposing is performed at a first location and includes a process to minimize an overlap between the simple components; and transmitting parameters representing the simple components to a second location for reconstructing the formation data. A system for analyzing formation data that includes a processor and a memory that stores a program having instructions for decomposing the formation data into simple components that can be used to reconstruct the formation data, wherein the decomposing is performed at a first location and includes a process to minimize an overlap between the simple components; and transmitting parameters representing the simple components to a second location for reconstructing the formation data.

22 Claims, 7 Drawing Sheets

METHODOLOGY AND APPLICATION OF MULTIMODAL DECOMPOSITION OF A COMPOSITE DISTRIBUTION

This application claims priority from U.S. Provisional Application No. 60/981,690 filed Oct. 22, 2007.

BACKGROUND OF INVENTION

1. Field of the Invention

The invention relates generally to oil and gas exploration, particularly to methods and systems for deriving formation properties from formation logging data, more particularly to the decomposition of complex data sets for use in interpreting well logging data.

2. Background Art

Subsurface or downhole logging techniques are realized in different ways as known in the art. A well tool, comprising a number of transmitting and detecting devices for measuring various parameters, can be lowered into a borehole on the end of a cable or wireline. The cable, which is attached to some mobile processing center at the surface, is the means by which parameter data may be sent up to the surface. With this type of logging, it becomes possible to measure borehole and formation parameters as a function of depth, i.e., while the tool is being pulled uphole.

An alternative to wireline logging techniques is the collection of data on downhole conditions during the drilling process. By collecting and processing such information during the drilling process, the driller can modify or correct key steps in the operation to optimize performance. Schemes for collecting data of downhole conditions and movement of the drilling assembly during the drilling operation are known as measurement-while-drilling (MWD) techniques. Similar techniques focusing more on measurement of formation parameters than on movement of the drilling assembly are known as logging-while-drilling (LWD). Note that drilling operations may also use casings or coil tubings instead of conventional drill strings. Casing drilling and coil tubing drilling are well known in the art. In these situations, logging operations may be similarly performed as in conventional MWD or LWD. In this description, "logging-while-drilling" will be generally used to include the use of a drill string, a casing, or a coil tubing, and hence MWD and LWD are intended to include operations using casings or coil tubings. Logging-while-tripping (LWT) is an alternative to LWD and MWD techniques. In LWT, a small diameter "run-in" tool is sent downhole through the drill pipe, at the end of a bit run, just before the drill pipe is pulled. The run-in tool is used to measure the downhole physical quantities as the drill string is extracted or tripped out of the hole. Measured data is recorded into tool memory versus time during the trip out. At the surface, a second set of equipment records bit depth versus time for the trip out, and this allows the measurements to be placed on depth. Sensors or tools permanently placed in a wellbore may also be used to obtain log data. Embodiments of the invention may use data obtained with any of these different logging methods.

FIG. 1 shows a typical LWD system that includes a derrick 10 positioned over a borehole 11. A drilling tool assembly, which includes a drill string 12 and drill bit 15, is disposed in the borehole 11. The drill string 12 and bit 15 are turned by rotation of a Kelly 17 coupled to the upper end of the drill string 12. The Kelly 17 is rotated by engagement with a rotary table 16 or the like forming part of the rig 10. The Kelly 17 and drill string 12 are suspended by a hook 18 coupled to the Kelly 17 by a rotatable swivel 19. Drilling fluid (mud) 6 is stored in a pit 7 and is pumped through the center of the drill string 12 by a mud pump 9 to flow downwardly. After circulation through the bit 15, the drilling fluid circulates upwardly through an annular space between the borehole 11 and the outside of the drill string 12. Flow of the drilling mud 6 lubricates and cools the bit 15 and lifts drill cuttings made by the bit 15 to the surface for collection and disposal. As shown, a logging tool 14 is connected to the drill string 12. Signals measured by the logging tool 14 may be transmitted to the surface computer system 13 or stored in memory (not shown) onboard the tool 14. The logging tool 14 may include any number of conventional sources and/or sensors known in the art.

Formation logging data obtained in wellbore need to be transmitted to surface for analysis. However, these data are often quite voluminous and are difficult to transmit efficiently, especially from LWD, MWD, or LWT operations. In addition, these data need to be processed to derive formation properties (formation profiles). The large volume of data do not lend themselves to easy transmission or analysis. One approach to overcome this problem is to preprocess the large amount of data into a smaller subset that still represents the original data, for example by decomposing the complex distribution into individual components with well defined parameters. One particularly attractive approach is to decompose the complex data into individual components that corresponds to the underlying physical events.

However, many petrophysical parameters (e.g. porosity, fracture spacing) have complex distributions that are often the result of several natural phenomena or physical processes superimposing themselves on each other (e.g., grain interposity, vug porosity, multiple fracture sets from different geological events). Log data therefore often manifest themselves as complex distributions of overlapping components. As a result, the discrete phenomena, processes, etc. that contribute to such complex distributions of log data are difficult to extract.

U.S. Pat. No. 7,133,777 issued to the Goswami et al. discloses methods for decomposing complex distributions into a set of underlying simpler components that can be individually processed. These methods decompose complex distributions of data by modeling the complex distribution as a sum of discrete simple distributions (such as Gaussian distributions) and extract parameters of these discrete simple distributions to facilitate data transmission and analysis.

The methods disclosed in the '777 patent demonstrated the usefulness of such an approach. However, there is still a need for methods that can accurately simplify complex distributions of data so that they can be easily transmitted and used to reconstruct the events that underlie the complex distributions of the measurement data.

SUMMARY OF INVENTION

One aspect of the invention relates to methods for analyzing formation data. A method in accordance with one embodiment of the invention includes decomposing the formation data into simple components that can be used to reconstruct the formation data, wherein the decomposing is performed at a first location and includes a process to minimize an overlap between the simple components; and transmitting parameters representing the simple components to a second location for reconstructing the formation data.

Another aspect of the invention relates to systems for analyzing formation data. A system in accordance with one embodiment of the invention includes a processor and a memory that stores a program having instructions for decomposing the formation data into simple components that can be used to reconstruct the formation data, wherein the decomposing is performed at a first location and includes a process to minimize an overlap between the simple components; and transmitting parameters representing the simple components to a second location for reconstructing the formation data.

Other aspects and advantages of the invention will be apparent from the following description and the appended claims.

DETAILED DESCRIPTION

Embodiments of the invention relate to methods and systems for deconvolving complex distributions of log data into simpler, discrete components that are more amenable to transmission and analysis. Methods of the invention decompose complex distributions into simpler, discrete component distributions. When there is physical meaning to the individual distributions, these methods also allow an user to steer the decomposition algorithm to solution that are physically meaningful.

U.S. Pat. No. 7,133,777, issued to the inventors of the present invention, discloses an algorithm to decompose a given property distribution into its Gaussian components. The '777 patent is incorporated by reference in its entirety. Briefly, a complex distribution, $f(x)$ can be approximated in terms of some primary distributions $\{\phi_n(x); n=1,2, \ldots N\}$ as:

$$f(x) \approx \tilde{f}(x) = \sum_{n=1}^{N} C_n \phi_n(x) \quad (1)$$

where $\tilde{f}(x)$ is an approximation of the complex distribution function $f(x)$. If one assumes the primary distribution functions as Gaussian, then equation (1) can be rewritten as:

$$f(x) \approx \tilde{f}(x) = \sum_{n=1}^{N} C_n \exp\left\{\frac{(x-\mu_n)^2}{\sigma_n^2}\right\}. \quad (2)$$

Where the parameters $\{C_n, \mu_n, \sigma_n\}$ represent the Gaussian parameters (i.e., amplitude, mean, and standard deviation) of the $n^{th}$ Gaussian component.

In the '777 patent, parameters $\{C_n, \mu_n, \sigma_n\}$ in equation (2) were obtained by minimizing a mismatch function defined as:

$$R_e = \frac{\sum_{i=1}^{M} |f(x_i) - \tilde{f}(x_i)|^2}{\sum_{i=1}^{M} |f(x_i)|^2}; \quad (3)$$

where $\{x_i: i=1,2, \ldots, M\}$ are sampling locations in x.

Figure 2:
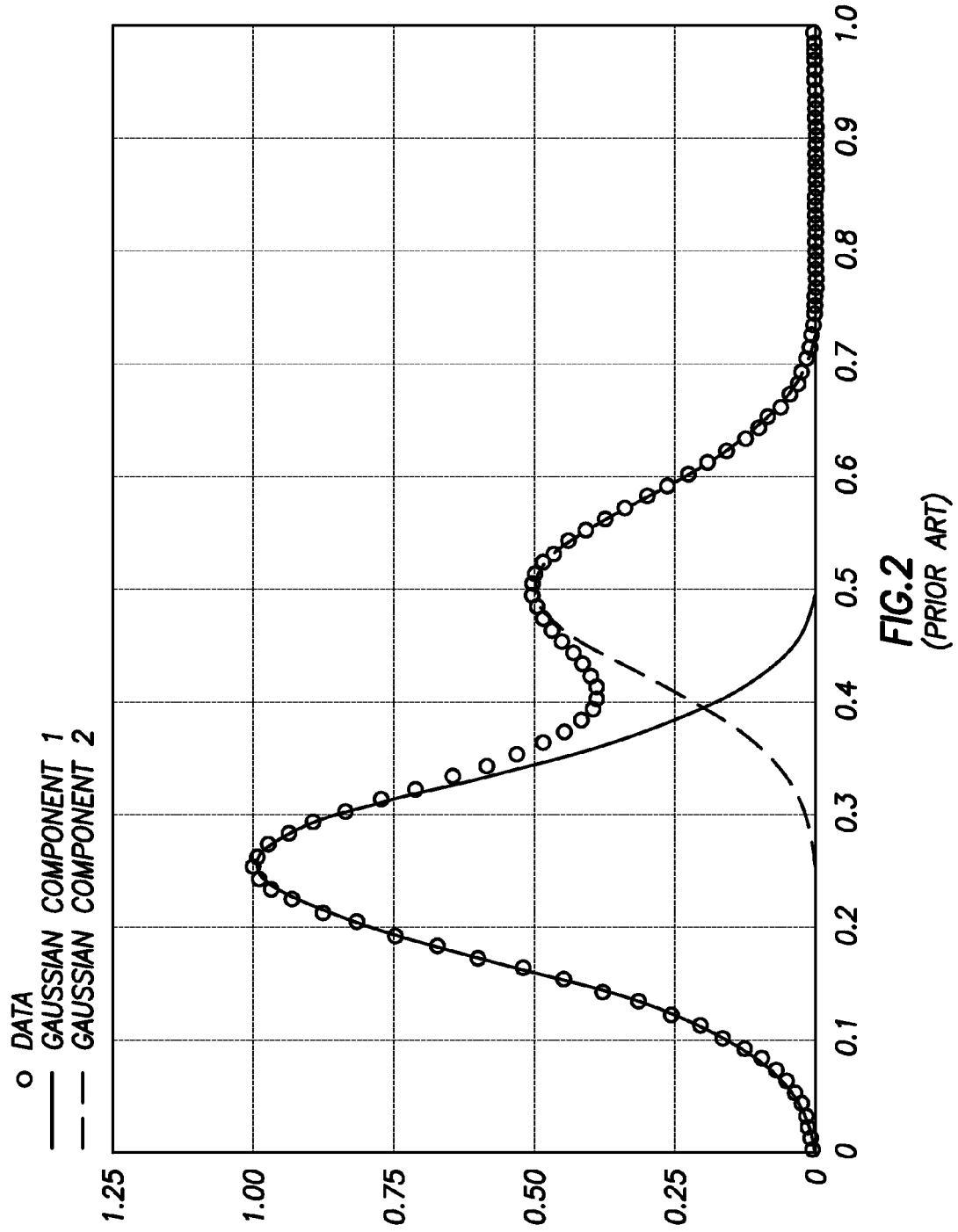
FIG. 2 shows a chart illustrating a complex curve with two discrete component representing the complex curve.

FIG. 2 shows an example of a data curves 21 that may represent a set of log data. The curve 21 has two apparent maxima (peaks), suggesting that there are probably two geophysical property distributions that partially overlap. By using the methods disclosed in the '777 patent, this complex distribution curve may be modeled as two Gaussian components 22 and 23. Each Gaussian component is defined by a mean (value at the peak location), an amplitude (peak height), and a standard deviation (peak spread). Therefore, the complex distribution of the original data can be represented by two sets of simple numbers that define the two Gaussian components. Accordingly, the log data can be greatly simplified and the transmission of these data will become much simpler. Once these simplified Gaussian component data are sent to the analyst, a curve can be reconstructed from the simplified Gaussian parameters (an example of a reconstructed curve is shown by the circles).

The usefulness of the methods disclosed in the '777 patent is evident from the example shown in FIG. 2. However, these methods may not work perfectly in all situations. That is, the reconstructed curves may deviate from the original data curves. One example of such problem is illustrated in FIG. 3.

Figure 3:
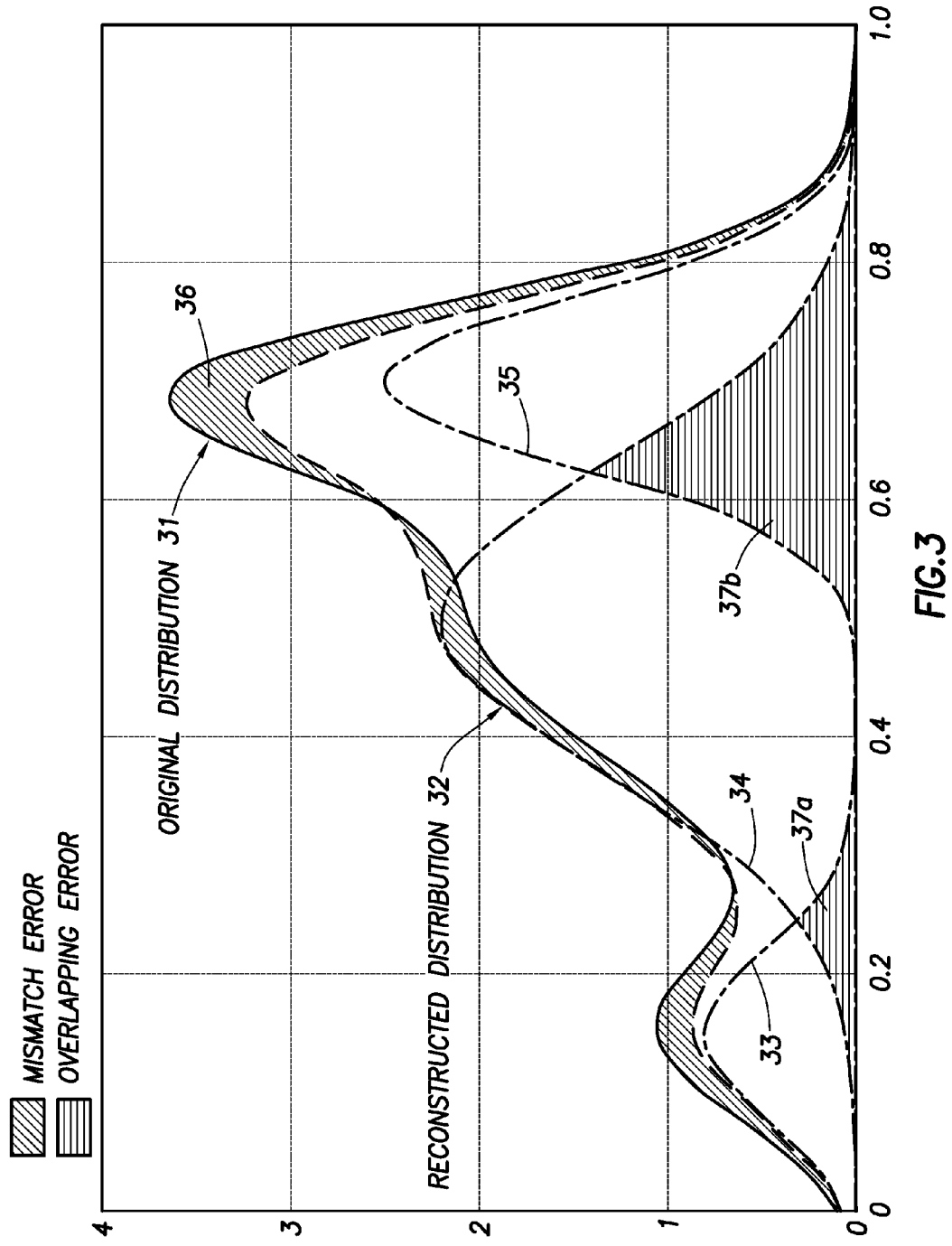
FIG. 3 shows a chart illustrating a complex curves having three Gaussian components representing the complex curve and illustrating the reconstructed curve. The chart shows the error or mismatch between the reconstructed curve and the original data curve. In addition, the chart shows the overlaps between the individual Gaussian components.

As shown in FIG. 3, the original distribution curve 31 can be decomposed into three Gaussian components 33, 34, 35, using a method disclosed in the '777 patent. A distribution curve 32 can be reconstructed from the parameters of the three Gaussian components. Even though, the reconstructed distribution curve 32 mimics the original distribution curve 31 fairly well, there are mismatch errors, shown as shaded areas 36. The errors most likely result from imperfect fitting of the three Gaussian components to the original distribution curve 31.

As disclosed in the '777 patent, the fitting of the Gaussian components to a complex data curve is achieved by minimizing an error function. However, minimization of such an error function does not always result in a perfect fit or a singular solution. For example, the reconstructed curve 32 in FIG. 3 has a region higher than the original curve 31 and two other regions lower than the original curve. Such over and under may add up to a minimal error; however, there is no guarantee that the fit is optimal. Furthermore, there are many possible combinations of "over" and "under" estimates that can give rise to minimal errors—i.e., there would be many possible solutions from such a fitting. Therefore, outputs form such optimization may not always produce accurate fits, nor is there any guarantee that the discrete components derived from such fitting correlate with actual geophysical events that contribute to the complex data curves.

Embodiments of the invention provide methods that can decompose complex, overlapping distributions of data into discrete components that may be more relevant to the physical events that contribute to the original complex data distribution. In accordance with embodiments of the invention, a complex distribution curve may be fitted with simple components (e.g., Gaussian components or other simple components such as standard distributions) in a manner similar to that disclosed in the '777 patent. However, methods of the invention impose an additional constraint to minimize any overlaps (shown as 37a, 37b in FIG. 3) between the neighboring components.

Thus, in accordance with embodiments of the invention, individual components (e.g., the Gaussian components) are forced to have no or little overlap. This is important when there is physical meaning to the decomposition or when the data had been previously processed under the assumption that there were little or no overlap between the underlying components that contribute to the overall data curve. With methods of the invention, an error function takes into account not only the mismatch between the reconstructed distribution curve and the original data curve, but also the overlapping areas between the neighboring modeled (e.g., Gaussian) components. One can adjust the relative weights given to these two terms (mismatch and overlap) in the error function to achieve the desired results.

Therefore, in accordance with embodiments of the invention, an error function (i.e., an objective function to be minimized) may take the following form:

$$J(C_n, \mu_n, \sigma_n) = w_1 R_e + w_2 R_o; \quad (4)$$

where $R_o$ is the normalized overlapping area, $R_e$ is a mismatch function, and $w_1$ and $w_2$ are relative weight constants. Normalization of overlapping areas is with respect to the total area of the given distribution. The mismatch function ($R_e$) measures the mismatch between the original data distribution and the reconstructed distribution (an example is shown in the equation (3), $w_1$ and $w_2$ are the relative weights for the two functions and should add up to 1. In the minimization of the error function shown above, there is often a trade-off—emphasizing one factor at the expense of the other by adjusting $w_1$ and $w_2$.

In order to fit the simple functions to the complex distribution curves by minimizing both the errors ($R_e$) and the overlaps ($R_o$) between the individual components, the problem becomes an optimization of multi-objective (two objective functions in this particular case). One approach to solving that problem is to consider the multiobjective optimization problem as a vector optimization problem. Various vector optimization algorithms are known in the art for solving multiobjective optimization problems, see for example, K. Deb, MultiObjective Optimization using Evolutionary Algorithm, New York: John Wiley, 2001. Any of such vector optimization methods may be used with embodiments of the invention, including an evolutionary algorithm.

Evolutionary algorithms are stochastic search methods that mimic the metaphor of natural biological evolution. Evolutionary algorithms operate on a population of potential solutions applying the principle of survival of the fittest to produce sequentially better and better approximations to a solution. At each generation, a new set of approximations is created by the process of selecting individuals according to their level of fitness in the problem domain and "breeding" them together using operators borrowed from natural genetics. This process leads to the evolution of populations of individuals that are better suited to their environment than the individuals that they were created from, just as in natural adaptation.

A pseudo-code for a typical evolutionary algorithm EA (e.g., a genetic algorithm) is shown as follows:

TABLE 1

Pseudo-Code for an Evolution Algorithm (EA)

// start with an initial time t := 0;
// initialize a usually random population of individuals initpopulation P (t);
// evaluate fitness of all initial individuals in population evaluate P (t);
// test for termination criteria (time, fitness, etc.), if not terminated do
    // increase the time counter t := t + 1;
    // select sub-population for offspring production P' := selectparents P (t);
    // recombine the "genes" of selected parents recombine P' (t);
    // perturb the mated population stochastically mutate P' (t);
    // evaluate its new fitness evaluate P' (t);
    // select the survivors from actual fitness P := survive P, P' (t);
End.

Multiobjective evolutionary algorithm is one example that can be used to optimize fitting of individual components (e.g., Gaussian components) to a complex data distribution curve, in accordance with embodiments of the invention. One of ordinary skilled in the art would appreciate that other algorithms for solving multiobjective optimization problems known in the art may also be used.

In addition, some embodiments of the invention may obviate the multiobjective optimization process by simplifying the problem as a scalar problem. For example, the bi-objective problem shown above may be converted into a scalar problem illustrated in equation (4). In equation (4), the two objectives are combined with relative weights into a scalar factor. The optimization of this combined objective becomes a scalar optimization problem. However, a judicial selection of the two relative weights is important. Otherwise, the results may not be relevant to the physical events.

Before one delves into optimization of the new scalar objective function (the error function) shown in equation (4), one needs to define the two objective functions in the equation. The mismatch function ($R_e$) is defined above in equation (3). The other objective function, i.e., the function relating to the overlaps ($R_o$), can be defined as follows. The overlap areas (37a and 37b in FIG. 3) between the neighboring Gaussian components relates to an integrand of the product of the two Gaussian functions, such as that shown in equation (5) below:

$$\int_{-\infty}^{\infty} \exp[-\alpha_1(x-\mu_1)^2] \times \exp[-\alpha_2(x-\mu_2)^2] dx. \quad (5)$$

Before solving the integrand of equation (5), let's consider the product of two Gaussian functions:

$$\exp[-\alpha_1(x-\mu_1)^2] \times \exp[-\alpha_2(x-\mu_2)^2] = \quad (6)$$
$$\exp[-(\alpha_1+\alpha_2)x^2 + 2(\alpha_1\mu_1 + \alpha_2\mu_2)x] \times \exp(-\alpha_1\mu_1^2 - \alpha_2\mu_2^2) =$$
$$\exp[-\tilde{\alpha}(x^2 - 2\tilde{\mu}x + \tilde{\mu}^2)] \times \exp[\tilde{\alpha}\tilde{\mu}^2] \times \exp(-\alpha_1\mu_1^2 - \alpha_2\mu_2^2) =$$
$$\exp(-\alpha_1\mu_1^2 - \alpha_2\mu_2^2 + \tilde{\alpha}\tilde{\mu}^2)\exp[-\tilde{\alpha}(x-\tilde{\mu})^2].$$

Equation (6) shows that the product of two Gaussians is also a Gaussian, and the integral of a Gaussian is:

$$\int_{-\infty}^{\infty} \exp[-\alpha(x-\mu)^2] dx = \frac{1}{\sqrt{\alpha}} \int_{-\infty}^{\infty} \exp(-\xi^2) d\xi = \sqrt{\frac{\pi}{\alpha}}. \quad (7)$$

$$I = \int_{-\infty}^{\infty} \exp(-x^2) dx$$

$$I^2 = \int_{-\infty}^{\infty} \exp(-x^2) dx \times \int_{-\infty}^{\infty} \exp(-y^2) dy$$

$$= \int_{-\infty}^{\infty} \int_{-\infty}^{\infty} \exp[-(x^2+y^2)] dx\, dy$$

$$= \int_{0}^{\infty} \rho \exp(-\rho^2) d\rho \int_{0}^{2\pi} d\phi$$

$$= \pi \int_{0}^{\infty} \exp(-\xi) d\xi$$

$$= \pi$$

$$\Rightarrow I = \sqrt{\pi}$$

Therefore, the integral of a product of two Gaussians may be given by the following expression:

$$\int_{-\infty}^{\infty} \exp[-\alpha_1(x-\mu_1)^2] \times \exp[-\alpha_2(x-\mu_2)^2] dx = A\sqrt{\frac{\pi}{\tilde{\alpha}}} \quad (8)$$

where $A = \exp(-\alpha_1 \mu_1^2 - \alpha_2 \mu_2^2 + \tilde{\alpha}\tilde{\mu}^2);$ $\tilde{\alpha} = \alpha_1 + \alpha_2;$ $\tilde{\mu} = \dfrac{\alpha_1 \mu_1 + \alpha_2 \mu_2}{\alpha_1 + \alpha_2}$ Having calculated the area of an overlap, a normalized overlap function (e.g., $R_o$ shown in equation (4)) may be defined, for example, as a ratio (or percentage) of the overlap area over the total area under the complex distribution curve. Once the objective functions in equation (4) are defined, the optimization (i.e., minimization of an error function) may use any suitable methods known in the art.

As noted above, a proper choice of the relative weights in the error function of equation (4) may be important if the results are to be meaningful. In a general case, one can find Pareto optimal solutions and choose the best among them.

Pareto optimality, named after Italian economist Vilfredo Pareto, is a measure of efficiency in multi-criteria and multi-party situations. It is useful in multi-criteria decision-making. Multi-criteria problems are those in which there are two or more criteria measured in different units, and no agreed-upon conversion factor exists to convert all criteria into a single metric. Minimization of the two component error functions in equation (4) may be viewed as a two criteria optimization problem.

Figure 4:
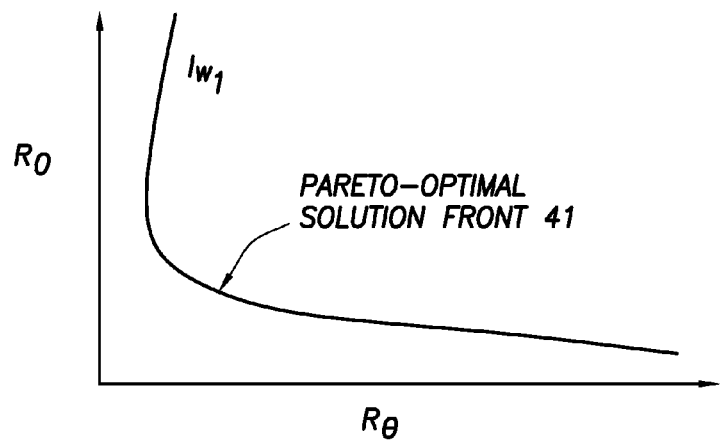
FIG. 4 shows a Pareto optimally diagram illustrating a Pareto optimal front.

Pareto optimality can be visualized in a scatter plot of solutions (as shown in FIG. 4). As shown in FIG. 4, each criteria (i.e., objective function $R_o$ and $R_e$) may be graphed on a separate axis. In this case, two criteria are to be minimized. Pareto-optimal solutions are those in the scatter plot with no points down and to the left of the two criteria axes. By varying $w_1$ and $w_2$, Pareto-optimal front can be plotted as the boundary line 41 in FIG. 4. The desired solution will be a proper $w_1$ and $w_2$ combination of the on this Pareto boundary line. In accordance with some embodiments of the invention, a user may be provided with a visual aid of a Pareto plot to help select the optimal combination of $w_1$ and $w_2$, as illustrated in FIGS. 6(b)-6(e) below.

EXAMPLES

The application of methods of the invention will be illustrated in the following examples.

Figure 5:
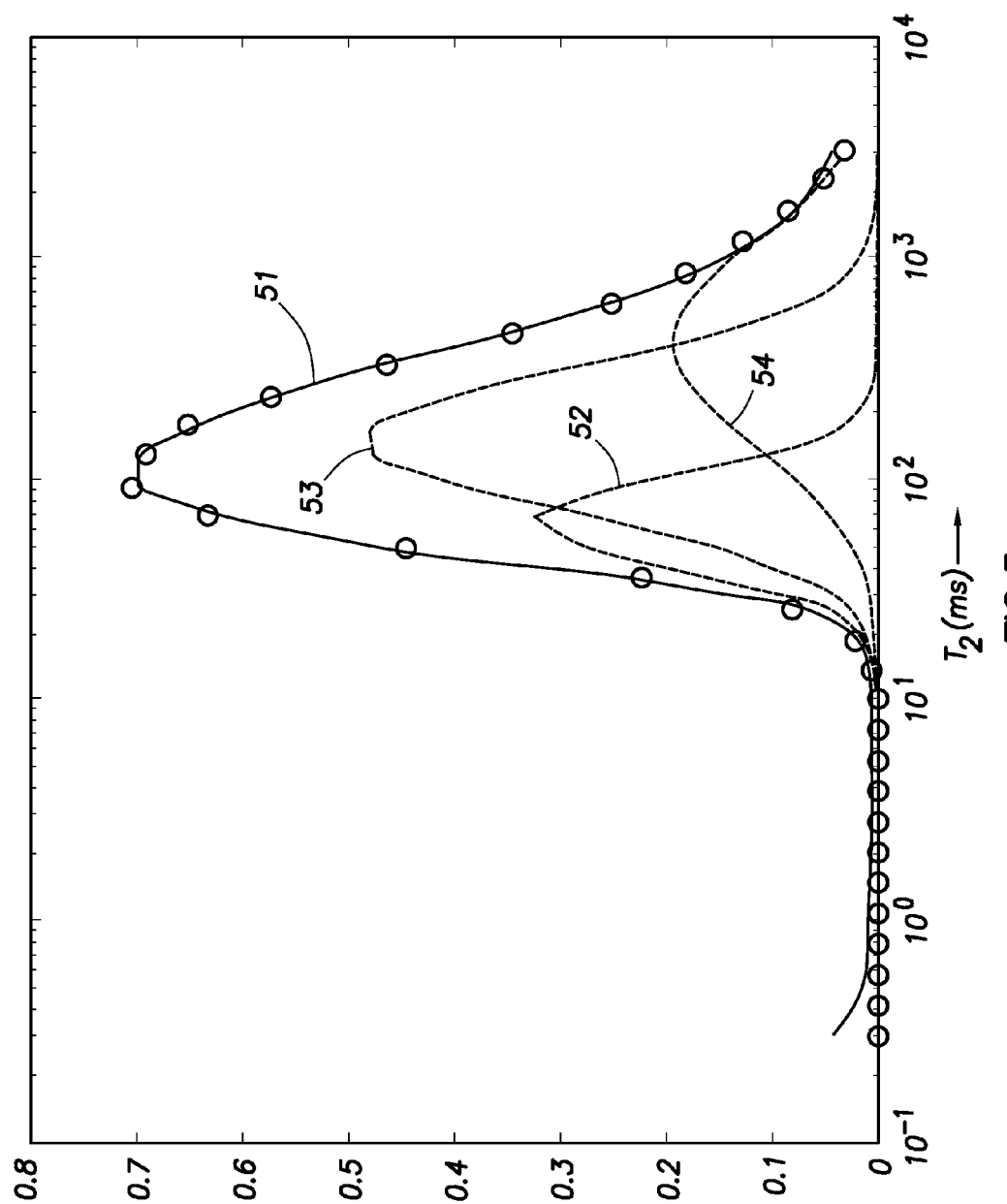
FIG. 5 shows a chart illustrating a complex data curve, three Gaussian components, and a reconstructed curve in accordance with one method of the invention.
Figure 6B:
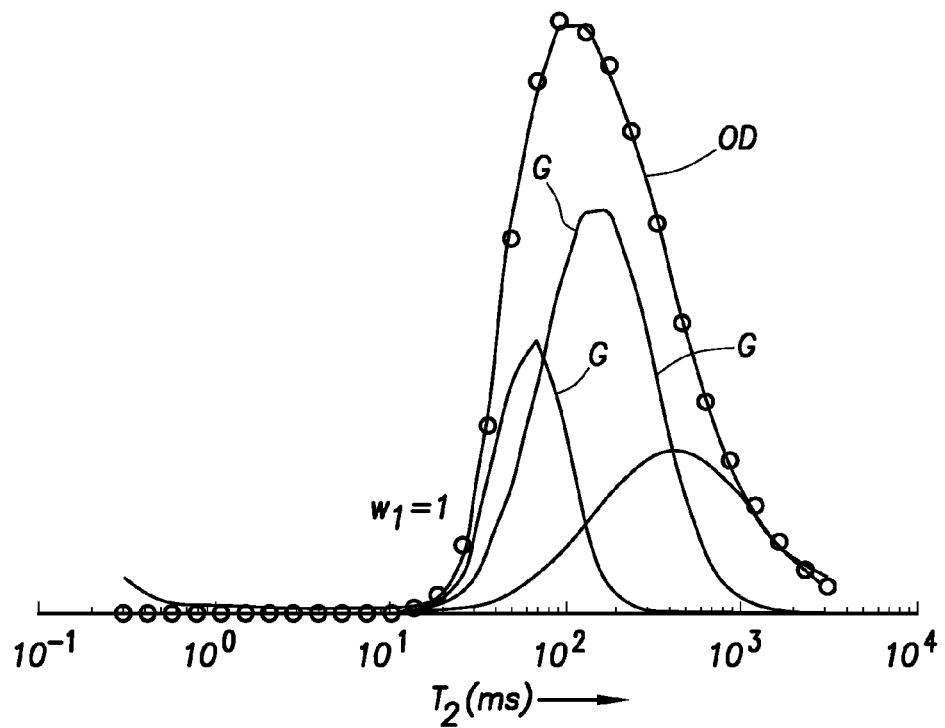
FIGS. 6(b)-(e) show various reconstructed curves and the Gaussian components with different weighting functions based on the Pareto optimal front shown in FIG. 6(a) for the data curve of FIG. 5 in accordance with one embodiment of the invention.
Figure 6C:
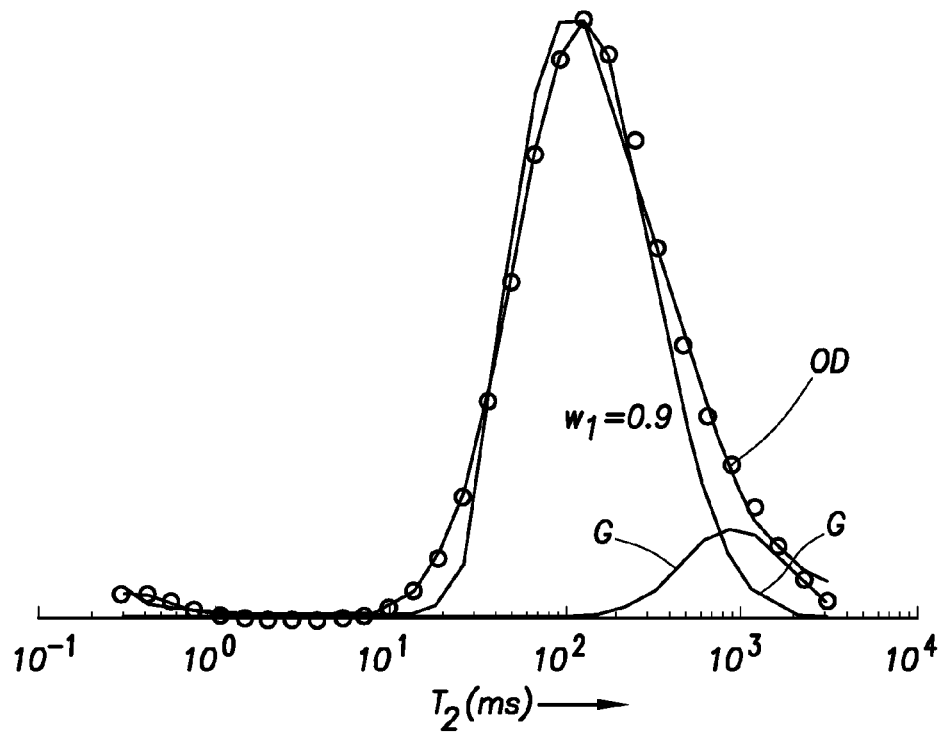
Figure 6D:
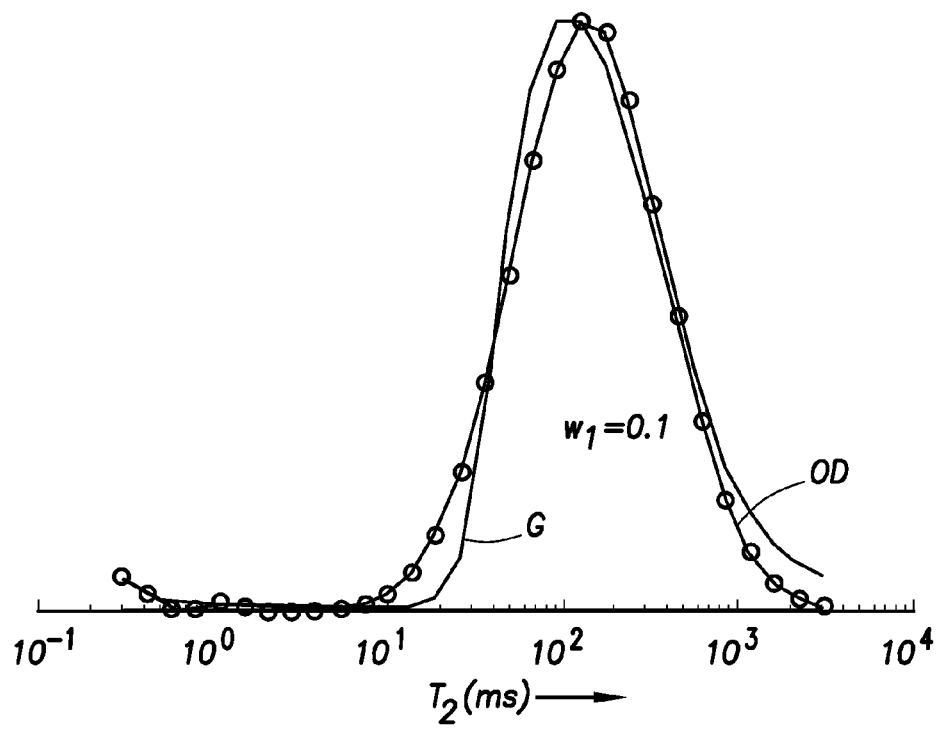
Figure 6E:
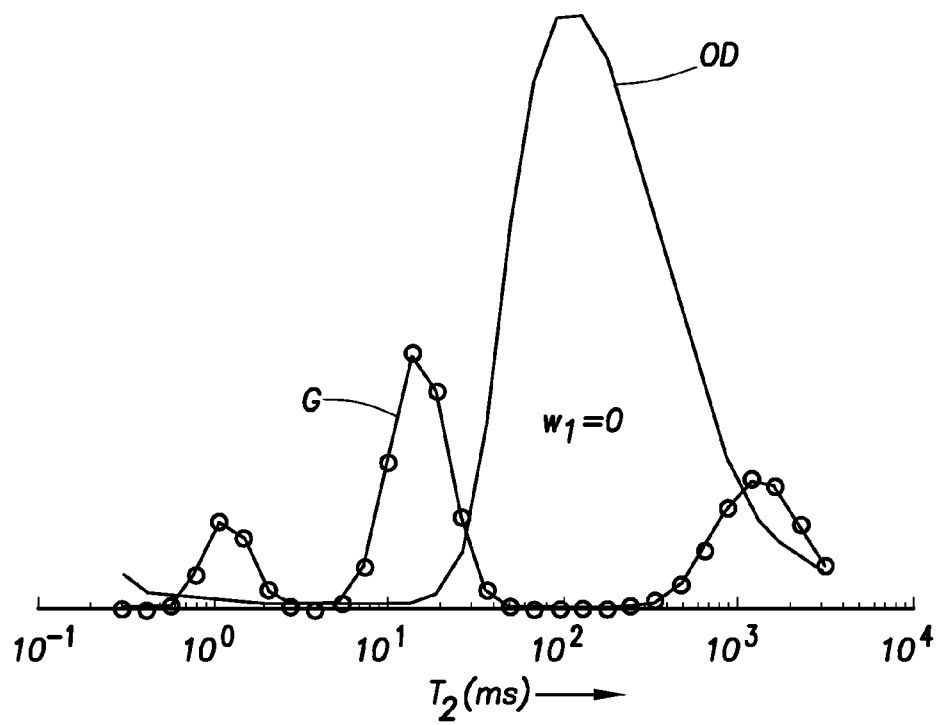

FIG. 5 shows a complex distribution curve 51, representing a T2 relaxation distribution of data obtained with an NMR tool. T2 (dipole) relaxation, which correlates with molecular mobility, has been shown to be very useful in providing insights into the compositions of fluids in formations. In general, hydrocarbons with greater mobilities (e.g., hydrocarbons in large pores or vugs, or less viscous hydrocarbons) have longer T2 values than those with more restricted mobilities (e.g., hydrocarbons bound on pore surfaces or viscous hydrocarbons). In addition, hydrocarbons generally have longer T2 values than those of water (bound or free water). Therefore, decomposition of a complex curves (as shown in FIG. 5) into individual components that contribute to the complex distribution curve will shed light on the compositions of the fluids in the formations.

In the example shown in FIG. 5, the complex distribution may be comprised of three simple (e.g., Gaussian) distributions 52, 53, 54 due to three different populations of fluids. Using a method of the invention, the decomposition of the complex distribution curve 51 into the three simple Gaussian components 52, 53, 54 can be accomplished by minimizing the error functions as shown in equation (4), which includes a component for the mismatch errors and a component for the overlap errors.

Figure 6A:
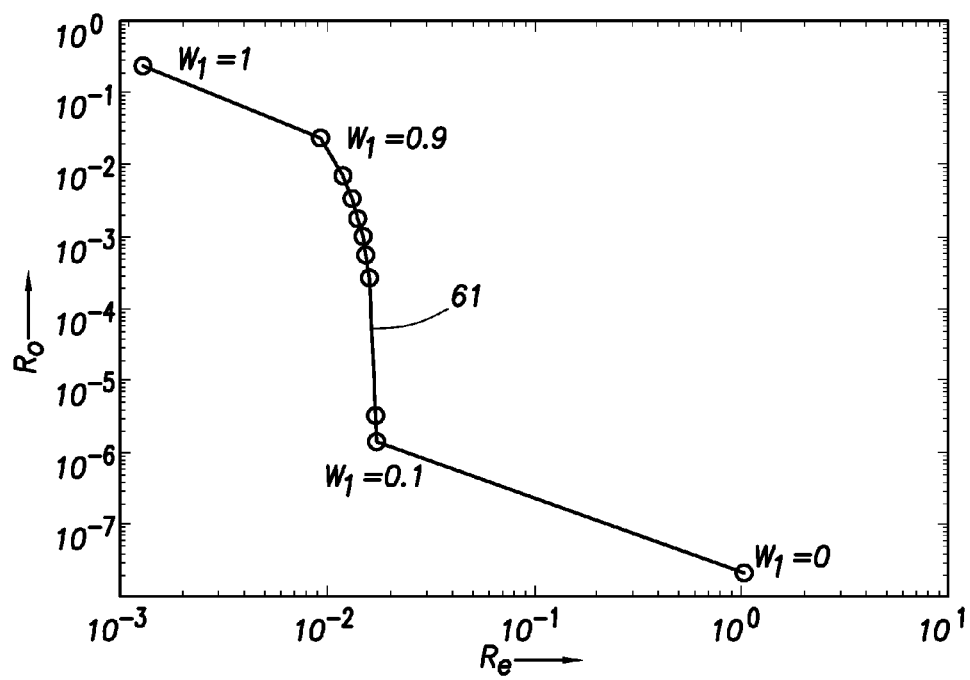
FIG. 6(a) shows a Pareto optimal chart for the data shown in FIG. 5.

FIG. 6(a) shows a Pareto-optimal plot for the data in FIG. 5. These data may be shown as a user-interactive display, where a user can slide a curser over the curve 61 (Pareto optimal front) and the corresponding plot similar to FIG. 5 is displaced in another view. The weight can also be shown so that the user can select the right value depending upon the specific problem. Four examples with different weights are shown in FIG. 6(b)-(e), in which original data are shown as curves OD, reconstructed data are shown as circles, and Gaussian components are shown as curves G, for different values of $w_1$.

Figure 1:
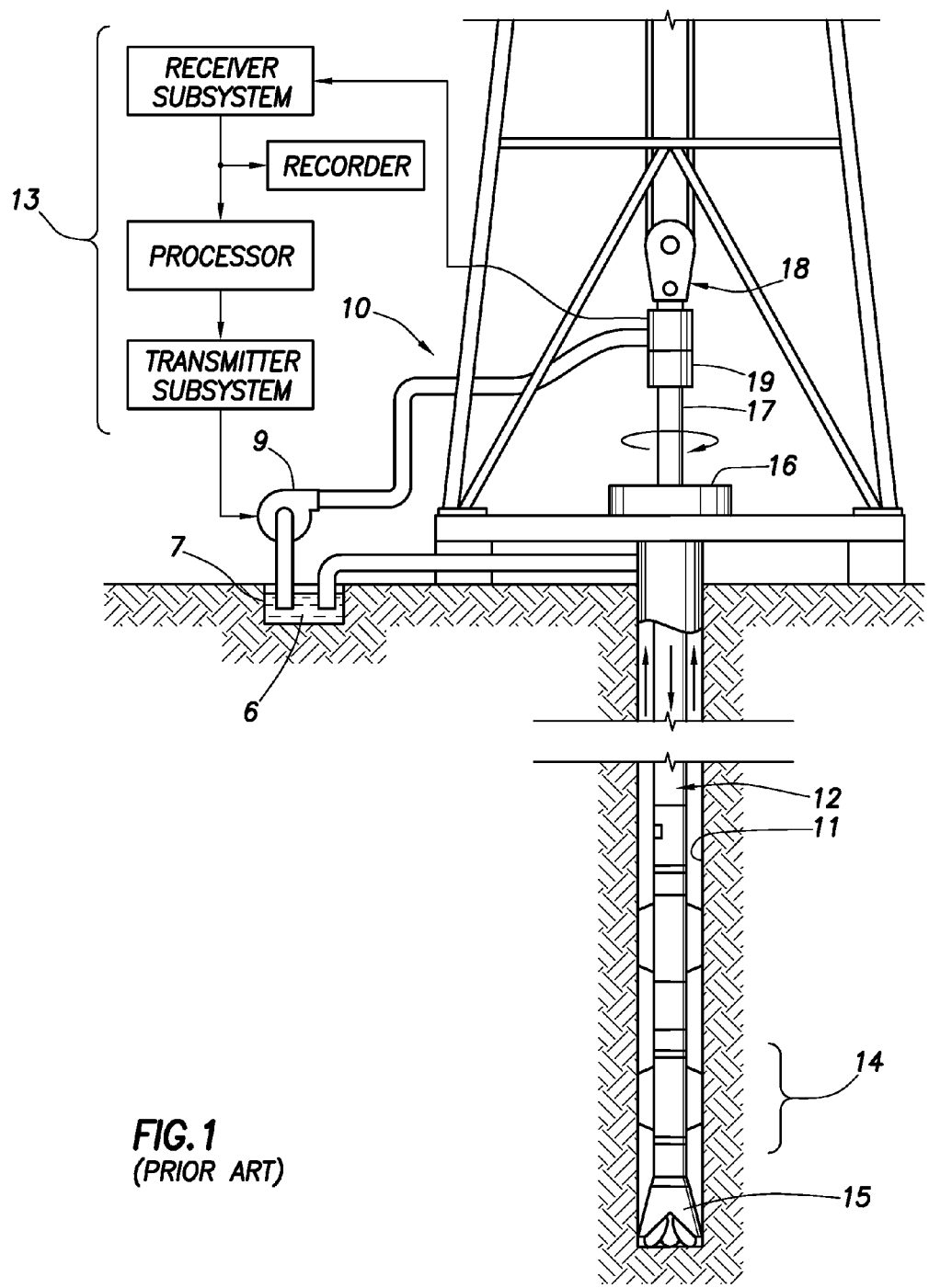
FIG. 1 shows a prior art logging-while-drilling system.

In accordance with embodiments of the invention, a method for decomposing complex data curve may be implemented on any computer, including a computing unit on a downhole tool, such as 14 shown in FIG. 1. Such a computer or computing unit typically includes a process and a memory, which are commonly known to one skilled in the art. The memory may store a program having instructions for performing the method steps described above. Once the complex curve is decomposed into simple components (e.g., Gaussian or other simple parameter distribution components), the parameters (e.g., amplitudes, means, and standard deviation) may be transmitted to a second location with relative ease. Once these parameters are available, the data curves may be reconstructed.

Methods of the invention may be used in any situation where decomposition of complex data into simpler components is desirable. The obvious application is to transmit log data from downhole to the surface (both in wireline and LWD operations), as described above (see FIG. 1). In addition, methods of the invention are also useful in simplifying data for transmission from well sites (or rigs or oil platform) to a laboratory or an office, or in other similar situations. By simplifying data, it becomes possible to transmit data in real time even if the original data are relatively voluminous.

Nowadays, new tools make more measurements and more data need to be transmitted and stored. Methods of the invention will facilitate not only the transmission, but also the storage of the data.

Advantages of embodiments of the invention may include one or more of the following. By taking into account the effects of overlaps between the simple components (e.g., the Gaussian components) that represent the complex data curve, the methods of the invention can provide more relevant discrete components, which may correspond to the underlying physical events, for the reconstruction of the original data curves. Being able to send relative small amount of data from the wellbore to the surface will make it possible to monitor the logging or drilling in real time. The operator can them make timely adjustment to change the operation of the logging or drilling, if necessary. Likewise, being able to transmit simplified data to a remote site makes it possible to transmit large volumes of data that is otherwise impracticable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing formation data, comprising:
    decomposing the formation data into simple components that can be used to reconstruct the formation data, wherein the decomposing step involves minimizing an error function that includes a mismatch function and an overlap function;
    minimizing an overlap between the simple components using a multi-objective optimization algorithm and a microprocessor at a first location, and transmitting parameters representing the simple components a second location for reconstructing the formation data.

2. The method of claim 1, further comprising obtaining the formation data in a wellbore using a logging tool.

3. The method of claim 2, wherein the logging tool comprises at least one of is a logging-while-drilling tool and a wireline tool.

4. The method of claim 1, wherein the simple components comprise Gaussian components.

5. The method of claim 4, wherein the parameters representing the simple components are amplitudes, means, and standard deviations.

6. The method of claim 1, wherein the error function is defined as $J=w1Re+w2Ro$, wherein Re is a mismatch function, Ro is an overlap function, w1, w2 are weighting parameters, and $w1+w2=1$, and wherein Ro comprises a ratio of an overlap area over a total area under the complex distribution curve.

7. The method of claim 6, wherein the decomposing comprises using Pareto optimization to find an optimal set of w1 and w2.

8. The method of claim 7, wherein the Pareto optimization generate a plot of Pareto optimality front that allows a user to select the optimal set of w1 and w2.

9. The method of claim 6, wherein the overlap function is defined as an integral of a product of two overlapping simple components.

10. The method of claim 6, wherein the overlap function is normalized relative to a total area under a curve representing the formation data distribution.

11. The method of claim 1, wherein the first location is in the wellbore and the second location is at surface.

12. The method of claim 1, wherein the first location is at a well site and the second location is at a remote site.

13. The method of claim 1, wherein the formation data comprises data that if decomposed according to a process that minimizes a total error without aiming to minimize an overlap between the simple components, the resulting simple components would contain increased overlap.

14. A system for analyzing formation data, comprising a processor and a memory that stores a program having instructions for:
    decomposing the formation data into simple components that can be used to reconstruct the formation data, wherein the decomposing step involves minimizing an error function that includes a mismatch function and an overlap function;
    minimizing an overlap between the simple components using a multi-objective optimization algorithm and a microprocessor at a first location, and transmitting parameters representing the simple components to a second location for reconstructing the formation data.

15. The system of claim 14, wherein the simple components comprise Gaussian components.

16. The system of claim 15, wherein the parameters representing the simple components are amplitudes, means, and standard deviations.

17. The system of claim 14, wherein the error function is defined as $J=w1Re+w2Ro$, wherein Re is a mismatch function, Ro is an overlap function, w1, w2 are weighting parameters, and $w1+w2=1$, and wherein Ro comprises a ratio of an overlap area over a total area under the complex distribution curve.

18. The system of claim 17, wherein the decomposing comprises using Pareto optimization to find an optimal set of w1 and w2.

19. The system of claim 18, wherein the Pareto optimization generate a plot of Pareto optimality front that allows a user to select the optimal set of w1 and w2.

20. The system of claim 17, wherein the overlap function is defined as an integral of a product of two overlapping simple components.

21. The system of claim 17, wherein the overlap function is normalized relative to a total area under a curve representing the formation data distribution.

22. The system of claim 17, wherein the formation data comprises data that if decomposed according to a process that minimizes a total error without aiming to minimize an overlap between the simple components, the resulting simple components would contain increased overlap.

* * * * *